Feb. 4, 1936. A. RONNING ET AL Re. 19,846

COMBINATION TRACTOR GRADER

Original Filed March 12, 1921 2 Sheets-Sheet 1

Inventors
ADOLPH RONNING
AND
ANDREAN G. RONNING, DECEASED
BY ADOLPH RONNING AND JACOB A.
RONNING, EXECUTORS
By Andrew C. Carlson
Attorney Feb. 4, 1936. A. RONNING ET AL Re. 19,846

COMBINATION TRACTOR GRADER

Original Filed March 12, 1921 2 Sheets-Sheet 2

Inventors
ADOLPH RONNING
AND
ANDREAN G. RONNING, DECEASED
BY ADOLPH RONNING AND JACOB A.
RONNING, EXECUTORS.

By Andrew E. Carlson
Attorney

Reissued Feb. 4, 1936 Re. 19,846

UNITED STATES PATENT OFFICE 19,846

COMBINATION TRACTOR GRADER

Adolph Ronning, Minneapolis, Minn., and Andrean G. Ronning, deceased, late of Minneapolis, Minn., by Jacob Ronning and Adolph Ronning, joint executors, Minneapolis, Minn.; said Adolph Ronning and Andrean G. Ronning, assignors to Ronning Machinery Company, Minneapolis, Minn., a corporation of Minnesota Original No. 1,706,256, date March 19, 1929, Serial No. 451,746, March 12, 1921. Application for reissue June 14, 1930, Serial No. 461,247

12 Claims. (Cl. 37—156)

This invention relates to road maintaining equipment, and the main object is to provide a combination tractor grader, in which a grader mechanism attachment is applied to a standard form of tractor in such a manner that they form substantially a single machine, and in which machine the grader and tractor controls are all preferably brought to within reach of a single operator stationed at the rear of the machine, whereby such an operator may have the entire machine under observation and control, so that he can not only conveniently watch the road and steer the machine, but can also operate the grader and tractor to control the position of the scraper blade and the speed of the machine. A further object is to render the grader frame attachment readily attachable and detachable with respect to the tractor, so that the tractor can be conveniently used for other purposes when so desired. A further object is to secure the grader frame in alignment with the tractor so that the weight of the tractor will supplement the weight of the grader mechanism in resisting the normal tendency of the dirt to move the angularly disposed grader blade transversely with respect to the direction of travel. A further object is to provide a grader attachment for a tractor in which the grader mechanism, while readily applied and detached, is so constructed that when attached to the tractor it will supplement the weight of the latter so as to greatly increase the traction effect of the traction members of the tractor. A further object is to provide a power grader in which the power plant and grading mechanism are not only under the convenient control of a single operator, but in which also the machine is so designed that it will readily lend itself to the use of a power plant of a standard or commercial design of tractor, thus taking advantage of the comparatively low cost of production had by tractor manufacturers producing such power plants in relatively large volumes. A further and more specific object is to provide means for utilizing a standard form of tractor in a combination tractor-grader machine, by removing or omitting the front or normal steering carriage of the tractor, and substituting therefor a grader supporting frame that in turn is supported by steering wheels to steer the machine.

In the specific arrangement last above mentioned the grader blade is applied to the frame and carried thereby in a position at the rear of the advanced front steering wheel unit and in front of the power unit.

The purpose of propelling a cutting blade along a road surface is to remove the inequalities in that surface, which it does by cutting off the high spots and filling in the low spots, and the road machine in which the operator can continually adjust the blade to the every varying conditions of the road surface is a necessity for this work.

On two men machines of the prior art, there is a seat in front from which a man steers and the operator does not have to concern himself with the steering of the machine, or if it is tractor propelled, the tractor, itself, is steered in the proper direction while the operator has only to make an occasional change to shift his machine to one side or the other. In all these cases, where more than one man is used, the operator is concerned only with his blade and he then need be located only so as to see the blade and the road itself in alignment, i. e., at one time, without moving his eyes. When, however, a self-propelled machine is operated by one man, a much different problem is presented; he must guide the entire machine and he must simultaneously control the blade. For the latter, two things are essential; first, the operator must be so located as to be able to distinguish the high spots from the low spots and, second, he must have quick and responsive control of the blade which will enable him to make the rapid adjustments essential to the ever changing character of the road surface. Where the road shows an excess elevation, the blade must be set to cut it off; where there is a depression, the blade must be set to fill it up. This requires a constant changing of the vertical position of the blade, and the efficiency of an ordinary road machine is determined largely by the effectiveness of its controls. For effective work, the operator must not only be in position to distinguish between high spots and low spots, but he must see them a sufficient time ahead of the blade reaching them to enable him to make the required changes in the position of the blade, to meet what is coming. This cannot be done by an operator stationed substantially above the blade and looking down on it for he is looking down at the same time at right angles on the surface of the road, in which position it is always difficult and sometimes impossible to tell a hill from a hollow, and the part of the road he can see without moving his head is only that which is directly in front of the blade.

On this type of machine, in order to see the blade and the road ahead of the machine, the operator must keep bobbing his head up and down or back and forth, like a chicken eating corn. His failure to bob frequently enough will lead him into the difficulty of not steering properly or of not manipulating the blade properly and even if he does bob as fast as nature permits him, he does not have the road in profile ahead of the blade, so that he can determine what adjustments of the blade should be made.

An object of this invention is to provide a self-propelled road machine guided and operated by one man, which overcomes all the above and other difficulties of prior machines, which can be comparatively easily and cheaply made, which is highly efficient in operation and is not readily liable to get out of order.

The present invention consists in a one-man, self-propelled machine, having front and rear wheel sustained axles between which the cutting blade is located, having all of the controls for the operation and steering of the machine centered at an operator's station, far enough behind the blade so that the front portion or cutting end of the blade, the surface of the road immediately in front of the blade on which the blade is scraping or grading, and a substantial zone of the road through which the machine is being propelled, are in substantial alignment and can be seen practically simultaneously by the operator at the control station without materially changing the angle of sight of his eyes.

In the accompanying drawings, which illustrate the invention, like characters indicate like parts throughout the several views.

Referring to the drawings.

Figure 1:
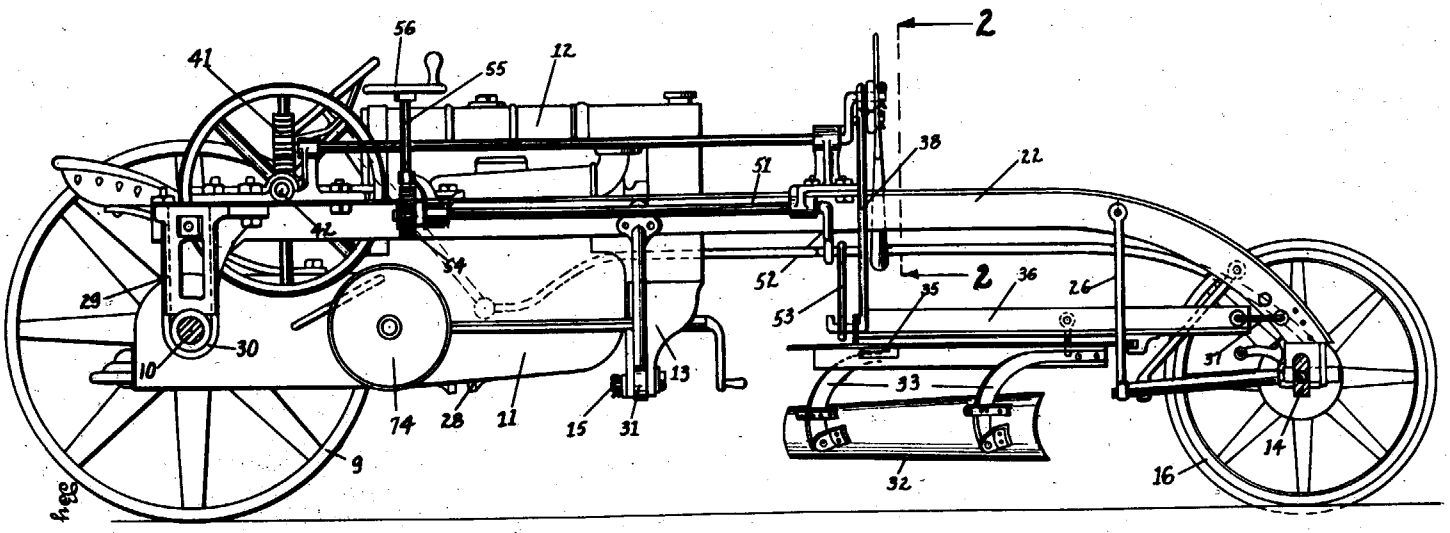
Fig. 1 is a side elevation with some parts sectioned and some parts removed, showing the improved tractor implement designed and equipped for use as a road planer or scraper.

As shown the grader attachment is applied to a tractor of conventional type, the construction of which is well known. Of the parts of this tractor, the numeral 9 indicates the rear traction wheels, 10 the rear axle, 11 the cast framework including the engine base and the numeral 12 the engine, which latter drives the rear traction wheels through any suitable transmission mechanism, which may be assumed to be a standard transmission mechanism of conventional design.

The elements just noted, except for the traction wheels or equivalent traction devices, constitute what is hereinafter referred to as the power unit of the tractor, or tractor power plant. The frame 11, at its front portion, has a depending forked coupling bracket 13, to which, the front axle 14 is adapted to be intermediately pivoted by a pivot bolt 15. The numeral 16 indicates the front steering wheels journaled on the customary spindle arms 17 pivoted to the axle 14 and provided with arms 18 connected for parallel movements by the customary spindle connecting rod 19. One of the spindles 17 has an arm 20, to which the steering gear connecting rod 21 is pivotally connected at its front end. The front wheels, front axle and connections just described constitute the steering wheel unit of the tractor, and in the normal commercial tractor, the axle 14 will, of course, be pivotally connected to the coupling bracket 13 by the pivot bolt 15, and the steering rod 21 then used will be the normal relatively short rod, not shown. The rod 21, illustrated, is a long substitute rod used for the arrangement illustrated as will presently appear.

For converting the normal tractor into a tractor grader such as above broadly indicated and as hereinafter described and illustrated, we provide a long so-called extension frame, which, as shown, is made up of laterally spaced parallel angle bars 22, the front ends of which are bent nearly or quite together and rigidly secured to a forked coupling bracket or head 23, to which the front axle 14, which is then removed from the coupling bracket 13, is now pivotally connected. The customary front radius rod 25 is removed with the axle 14 and its head is secured to the intermediate portion of a transverse yoke 26 hung from the frame bars 22 and braced by a rod 27 that is anchored to the coupling head or bracket 23. When the front axle 14 was coupled to the bracket 13 of the power unit, its head was anchored in a seat formed between lugs 28 on the bottom of the cast frame 11.

The rear ends of the frame bars 22 are provided with depending brackets 29 that rest on the rear axle 10 or a sleeve thereof and are rigidly clamped thereto by nut-equipped U-bolts 30. To support the front portion of the power unit from the intermediate portions of the frame bars 22, said bars 22 are provided with a rigid cross-connecting yoke 31, the depending central portion of which is placed in the fork of the coupling bracket 13 and secured thereto by the bolt 15, previously noted. Thus, the extension frame is rigidly coupled to the frame structure of the power unit and is, itself, securely braced.

Figure 2:
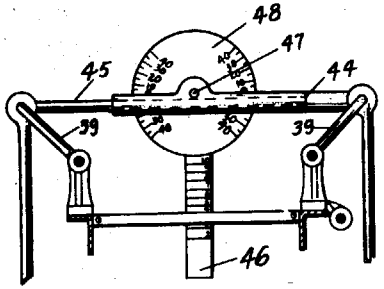
Fig. 2 is a detail in transverse section on the line 2—2 of Fig. 1.

The transformed tractor now described is adapted to carry and to operate various differen kinds of working units, one of which is illustrated. The working unit illustrated is a road planer or scraper and comprises a scraper blade 32, which, by curved draw-bars 33, is connected to an adjusting circle or annular member 34. The circle 34 is preferably an annular angle bar, the flange of which works in keeper brackets 35 secured on the bottom of a triangular supplemental frame 36. This supplemental frame 36, at its front end, is coupled to the front end of the frame bar 22 by a link 37, and at its rear end, is supported for vertical and angular adjustments by hanger links or rods 38, the upper ends of which are hung on the crank-like front ends 39 of rock shafts 40. These rock shafts 40 are extended longitudinally of the frame bars 22, are mounted in suitable bearings thereon and, at their rear ends, have worm gears 41 engaged by worms 42 suitably mounted on the rear portions of the frame bars 22 and arranged to be independently operated by hand wheels 43. As is evident, the opposite ends of the scraper blade 32 may be independently raised and lowered and the blade set to scrape at any desired angle by independent manipulation of the hand wheels 43. To indicate the angle at which the scraper blade is working there is provided a novel device, best illustrated in Fig. 2, by reference to which it will be noted that the two cranks 39 are connected by a telescopically extensible and contractible link made up of a tubular outer section 44 and inner member or rod 45, which link does not interfere with independent adjustments of the cranks. The numeral 46 indicates a gravity-arighted pendulum pivotally connected to the outer link member 44 at 47 and provided with a graduated dial 48. The dial 48, on opposite sides, is reversely marked in degrees from zero marks, which zero marks, when aligned with the top of the link 44, indicate that the scraper blade is working on the level or is horizontally disposed. On the pendulum 46 are graduations which indicate the depth of cut at which the scraper blade is set to work.

The scraper blade 32 is adapted to be set at any angle to scrape toward either side of the road by a lock pin 49 that is insertable through a perforation in the triangular supplemental frame 36 and through any one of a plurality of holes 50 in the circle or circular member 34.

Figure 3:
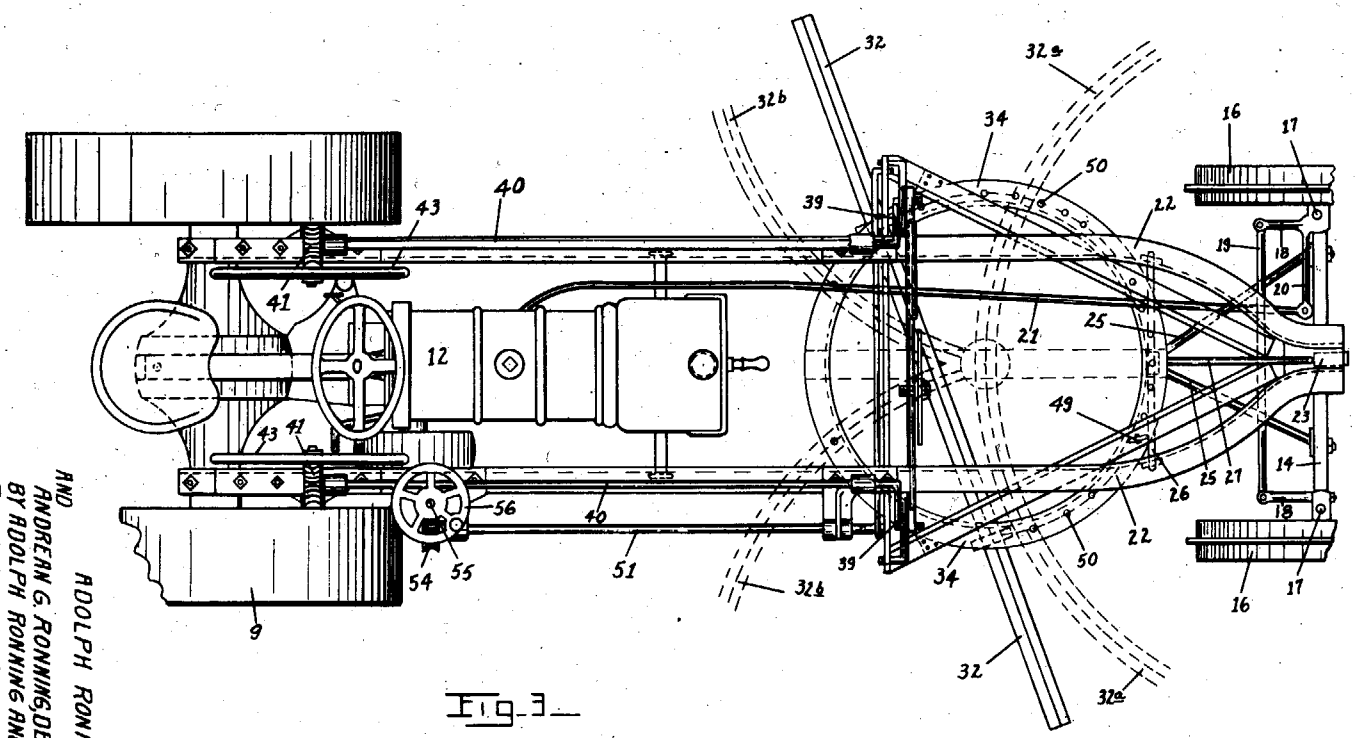
Fig. 3 is a plan view of the tractor implement shown in Fig. 1.

The scraper blade 32 may take different forms; it may be straight as shown by full lines in Fig. 3, continuously curved as indicated by dotted lines 32*a* or reversely curved as indicated by dotted lines marked 32*b* on Fig. 3.

The curved blade 32*a* would be useful to crown a road while the reversely curved blade 32*b* would be useful, for example, as a snow plow.

It is desirable that means be provided for shifting the scraper blade, supplemental frame 36 and intermediate connections transversely of the tractor, and, hence, we provide a crank shaft 51 mounted in suitable bearings on one of the frame bars 22 and provided at its front end with a depending crank 52 connected by a cross link 53 to the rear portion of the supplemental frame 36. As shown, the extended end of the link 53 is pivoted on a projecting laterally bent end of one of the hanger links 38.

At its rear end, the crank shaft 51 has a worm gear 54 that is engaged by a worm not shown but located on the lower end of an upright shaft 55 journaled in a suitable bearing on the adjacent frame bar 22 and provided at its upper end with a hand wheel 56.

The advantages of the tractor-grader combination thus described and shown, over machines heretofore known and in commercial use, are many, and may be briefly referred to as follows: The tractor and grader are incorporated in one unit, and are under the control of one operator, who is not only in an advantageous position at the rear of the machine to observe the position of the blade and the condition of the road ahead of the blade, but has all the tractor and grader controls within convenient reach, whereby the machine as a whole will quickly and properly respond to each adjustment made. As the weight of the grader and grader frame is supplemented to that of the tractor, the load on the wheels 9 is greatly increased and the traction power of the tractor is correspondingly increased. Similarly, as the weight of the tractor supplements the weight of the grader it greatly increases the resistance of the scraper blade to the tendency of the dirt to push the blade sidewise off of the road, which is particularly objectionable in the tractor or horse drawn graders used heretofore. As the frame 22 must be projected forwardly from the tractor a considerable distance, so as to accommodate the blade supporting and adjusting mechanisms, the total wheel base length of the machine is much greater than in an ordinary grader or tractor alone, and consequently the blade 32 operates in a more uniform and straight path of travel, and is not as sensitive to road surface irregularities as in the single unit type of machine. The tractor may, of course, be readily detached and reconverted back into its original or normal condition, for other work or uses.

As already noted, a specific advantage in the present invention resides in the fact that the operator stationed at the rear of the tractor has all the controls of the blade 32 where he can reach them without taking his eyes off from the forward end of the blade or the profile of the road surface to be cut or the general view of the road in front of the machine.

In other words, the blade 32 is so located between the front and rear axles and between the front axle and the engine 12, and the operator's station is so located that the operator, while having full control of the operation of the blade and the steering of the machine, has his eye on the blade to observe its work, and in alignment with the blade is the surface of the road directly ahead of it in profile—this so that the hills and the hollows on the road surface are clear and distinct to his eye and they are apparent to his eye sufficiently far ahead of the blade to enable him to change the blade to meet them, for in a properly operated machine the operator must have his eye on the blade itself, to see what it is doing and to follow its work. It is not intended to imply that the operator sees the whole blade for it is only the forward end of a blade which is cutting, generally about one-third to one-half of it which he must see. The opposite end is always slightly elevated from the ground to allow the earth to drift away under it in proper distribution. There is no necessity or advantage in the operator being able to see the rear half of the blade. The front half is the one doing the work. The operator must see that and the road in front of it, in substantial alignment and profile, and that is what he does see in this machine and fails to see in machines of the prior art.

Machines of this class generally work on a road more or less rough, with irregular contours. Its tendency is continually to slide to one side or the other, and the operator must continually control it with the steering apparatus, to keep it where it is wanted. It is seldom wanted to run in a straight line very long but is steered to one side or the other, to meet the changing conditions as they occur. In the present machine, the operator has all these things in his eye, so to speak, without moving his head. He has the blade which he must see, the profile of the road immediately ahead of the blade, which he must see, and the general zone of approach for some distance ahead of the machine, which he must see. These are all on an alignment, allowing him to do the needful at any point of the operation.

In another aspect of the situation, the machine of the drawings is a tractor, viz.: the engine 12, its traction wheels 9, and the controls for the engine; and a grader, viz.: the frame 22, front wheels 16, blade 32, the mountings therefor, and the controls for the grader, the two so combined that the weight of the tractor assists the grader in doing its work and the weight of the grader assists the tractor in doing its work, the controls for both the tractor and grader being located at a common station at the rear of the machine where the operator can view the blade and the road in the manner described. The necessity for and problem solved in such a combination lies in the following facts:

Practically the whole proposition of a road grader is to move dirt from the ditch at the side of a road up onto the crown or center of the road. The contest in every instance is between the ability of the machine to move the dirt sidewise and the ability of the dirt to move the machine sidewise. The machine will move the dirt as long as it is not overloaded, but the minute the maximum point of resistance is passed, instead of the dirt sliding away from the machine, the machine slides away from the dirt. The capacity of any machine to move dirt is fixed almost entirely by its own weight. There are a few mechanical contrivances embodied in prior machines such as leaning wheels, staggered axles, etc., for the purpose of assisting the machine to avoid sliding away from the dirt, but these are of minor effect and the machine can practically depend upon nothing but its own weight in its contest with the dirt.

In this contest, the machine gets no assistance whatever in its effort to keep from sliding sidewise, from detached power propelling it, be it horse, mule, trucks, separate tractors, or anything else. A separate 50 horsepower tractor weighing 10,000 pounds, to which the grader is attached, cannot help the grader in the slightest degree, from being pushed sidewise by the dirt. A separate 10 horsepower tractor weighing 1,000 pounds will mean just the same to the grader in the matter of sliding sidewise and it can do no good to the grader to supply it with any amount of surplus power beyond the power required to pull the grader with its maximum load which it can handle without being skidded off by the dirt. The radical and fundamental difference between that of a grader drawn by separate power and the one of this invention is that in this grader, the tractor or propelling power is built into, and, as to weight, becomes an integral part of the grader itself and the weight of the tractor, by being added to the weight of the grader, enormously increases the ability of the grader to resist the side push of the dirt. Grader manufacturers have realized for years the unfortunate limitation placed upon all graders by their inability to use any of the weight of the separate tractor to increase their machine's capacity for dirt moving, and producing the structure this invention has produced, with the immediate result of making a large market for a class of machines which has never heretofore existed. The machine of this invention combines a 4,000 pound tractor with a 1,000 pound grader and obtains the equivalent of a 5,000 pound grader in the matter of dirt moving capacity, so that the difference between this machine and prior machines is radical and fundamental as is evidenced by the large sales of this new type of machine immediately upon its presentation, and one of the great sources of such success is the location of all the controls of both the tractor and grader at a common point at the rear of the machine where the operator has the described view of the blade and the road.

The invention having now been fully set forth, what is claimed is:

1. In a one man grader, in combination with not to exceed two wheel sustained axles connected by a frame, a power plant supported by the frame, and an operator's station at the rear of the machine, a floating frame below the first frame loosely connected at a fixed point near the front axle, a road cutting blade carried by the floating frame forward of the power plant, and means extending to the operator's station for selectively elevating and lowering either side of the floating frame.

2. In a one man grader, in combination with not to exceed two wheel sustained axles, connected by a frame bearing a power plant, and an operator's station at the rear of the machine, a floating frame below the first frame loosely connected at a fixed point near the front axle, a road cutting blade carried by the floating frame forward of the power plant, and means extending to the operator's station for swinging the floating frame crosswise of the main frame.

3. In a one man grader, in combination with not to exceed two wheel sustained axles, connected by a frame bearing a power plant, and an operator's station at the rear of the machine, a floating frame below the first frame loosely connected at a fixed point near the front axle, a road cutting blade carried by the floating frame forward of the power plant, and means extending to the operator's station for adjusting in a horizontal plane the angle of the blade.

4. In a one man grader, in combination with not to exceed two wheel sustained axles, connected by a frame bearing a power plant, and an operator's station at the rear of the machine, a floating frame below the first frame loosely connected at a fixed point near the front axle, a road cutting blade carried by the floating frame, and means extending to the operator's station for selectively elevating and lowering either side of the floating frame, the blade being in such a position in front of the operator's station and power plant that, while operating any or all of said adjusting devices, the operator's eye can, without moving his head, embrace the front end of the blade, the surface of the road in profile immediately ahead of the blade, and the road a substantial distance in front of the blade.

5. In a one man grader, in combination with two wheel sustained axles, connected by a frame bearing a power plant, and an operator's station at the rear of the machine, a floating frame below the first frame loosely connected at a fixed point near the front axle, a road cutting blade carried by the floating frame, and means extending to the operator's station for swinging the floating frame crosswise of the main frame, the blade being in such a position in front of the operator's station and power plant that, while operating any or all of said adjusting devices, the operator's eye can, without moving his head, embrace the front end of the blade, the surface of the road in profile immediately ahead of the blade and the road a substantial distance in front of the blade.

6. In a one man grader, in combination with not to exceed two wheel sustained axles, connected by a frame bearing a power plant, and an operator's station at the rear of the machine, a floating frame below the first frame loosely connected at a fixed point near the front axle, a road cutting blade carried by the floating frame, and means extending to the operator's station for adjusting in a horizontal plane the angle of the blade, the blade being in such a position in front of the operator's station and power plant that, while operating any or all of said adjusting devices, the operator's eye can, without moving his head, embrace the front end of the blade, the surface of the road in profile immediately ahead of the blade and the road a substantial distance in front of the blade.

7. In a self-propelled road machine, the combination of a power plant, traction devices supporting the rear of the power plant, a frame secured to and supporting the forward end of said plant, a wheeled support for the front end of said frame, a cutting blade carried in front of said plant beneath said frame, behind the front wheeled support, devices for vertically adjusting said blade, an operator's station at the rear of said power plant, and means at said station for operating said adjusting devices while the blade is under visual control of an operator at the station.

8. In a self-propelled road machine having not more than four traction wheels, the combination of a frame having a wheeled support for the front end thereof, a tractor secured to and supporting the rear end of said frame, a cutting blade mounted behind the front wheel support, in front of said tractor, for vertical, transverse and angular adjustment, and an operator's station at the rear of said tractor, means operable from said station for effecting said adjustments.

9. In a self-propelled, one-man road machine, sustained at its rear by traction devices, the combination of a frame, a wheeled support for the front end of said frame, a power plant secured to and supported by said frame, a cutting blade supported behind the wheels in front of said power plant for vertical, transverse and angular adjustment, an operator's station at the rear of the power plant, and means operable from said station for effecting said adjustments.

10. In a self-propelled, one-man road machine carried by wheels on not more than two separated axles, the combination of a power plant comprising the rear wheels, axle, transmission and engine of a tractor, with a frame secured to and supporting said plant, a wheeled support for the front end of said frame, a cutting blade carried behind the front wheels, in front of said plant, and beneath said frame, devices for adjusting said blade into operative position, an operator's station at the rear of said power plant, and means at said station for operating said devices.

11. The combination of a road grader having steering wheels and rearwardly extending controls, a tractor provided with propelling wheels and rearwardly extending controls, an operator's station at the rear of the machine receiving all said controls and means connecting the grader and tractor in a manner permitting the tractor weight to assist the grading operation and also permitting the grader weight to lend additional traction to the tractor propelling wheels.

12. The combination of a road grader having an elongated frame provided with steering wheels at the front end and blade adjustment controls leading to the rear, a tractor, having propelling wheels, in the rear of the grader frame, its front end steered and carried by the grader frame, and means at the rear of both the grader and tractor for the simultaneous control of each.

ADOLPH RONNING.
ADOLPH RONNING,
JACOB RONNING,

*Executors of the Estate of Andrean G. Ronning, Deceased.*